United States Patent
Shen et al.

[11] Patent Number: 6,115,423
[45] Date of Patent: Sep. 5, 2000

[54] IMAGE CODING FOR LIQUID CRYSTAL DISPLAYS

[75] Inventors: Tsae-Pyng Janice Shen; Homer H. Chen; Marius S. Vassilou, all of Thousand Oaks, Calif.

[73] Assignee: Rockwell Science Center, LLC, Thousand Oaks, Calif.

[21] Appl. No.: 08/974,308

[22] Filed: Nov. 19, 1997

[51] Int. Cl.[7] .............................. H04N 7/36; H04N 7/50
[52] U.S. Cl. ................................ 375/240.03; 345/204
[58] Field of Search ................ 375/240.03, 240.16, 375/240.29; 348/416.1, 405.1; 345/87, 94, 204; H04N 7/36, 7/50

[56] References Cited

U.S. PATENT DOCUMENTS

| | | | |
|---|---|---|---|
| 4,780,761 | 10/1988 | Daly et al. | 348/408 |
| 5,335,016 | 8/1994 | Nakagawa | 348/405 |
| 5,614,946 | 3/1997 | Fukuoka | 348/405 X |
| 5,909,513 | 6/1999 | Liang et al. | 348/405 X |

OTHER PUBLICATIONS

James Larimer, "Visual Effects of the Black Matrix in Tessellated Displays," SID 95 DIGEST, 99, 1995.

"Video Coding for Low Bitrate Communication," Telecommunication Standardization Sector of International Telecommunication Union (ITU), Draft H.263, pp. 1–49, Dec. 5, 1995.

Peter Barten, "Simple Model for Spatial Frequency Masking and Contrast Discrimination," Human Vision, Visual Processing & Digital Display VI, SPIE vol. 2411, pp. 142–158, Feb., 1995.

*Primary Examiner*—Howard Britton
*Attorney, Agent, or Firm*—Koppel & Jacobs

[57] ABSTRACT

A source coder exploits the spatial and temporal masking properties of a LCD flat panel display to improve perceptual quality over a limited bandwidth channel. The LCD's black matrix generates a strong noise component centered at the Nyquist frequency that masks the portion of the signal spectrum that lies near the Nyquist frequency. The sluggish response times of liquid crystals creates a temporal mask that further reduces the spatial resolution of moving objects. In response, the source coder shifts bits from masked transform coefficients to unmasked coefficients thereby improving the perceived visual quality of the reconstructed image. The image coder can also be designed to match the color depth associated with the LCD.

24 Claims, 4 Drawing Sheets

IMAGE CODING FOR LIQUID CRYSTAL DISPLAYS

BACKGROUND OF THE INVENTION

1. Field of the Invention

This invention relates to image coding and more specifically to a source coder and method of allocating quantization bits based upon the spatial and temporal masking effects of a liquid crystal display (LCD) to improve perceptual quality.

2. Description of the Related Art

Image coding is used to compress the total number of bits used to represent a digital image, still or moving, while maintaining the quality of the reconstructed and displayed image. Image coding is used in broadcast systems to encode a video signal that is transmitted over a limited bandwidth channel, decoded and displayed. Image coding is also used to compress still or video imagery for storage purposes. The amount of bandwidth required to transmit a signal and the amount of memory needed to store a signal are directly reflected in the cost of the system. However, the desire to reduce bandwidth or memory by increasing the amount of compression must be balanced against the need to maintain a high quality signal. The balance will greatly depend upon the system constraints and the desired quality.

Most compression techniques use either predictive or transform coding algorithms. Predictive algorithms are the simplest but provide the poorest performance. Transform based coding algorithms such as the Discrete Cosine Transform (DCT), Discrete Sine Transform (DST), the Karhonen-Loeve (KL) transform, or Wavelet transform, for example, provide far superior performance than predictive coders but are more complex.

In general, transform algorithms decorrelate the image by projecting it onto a set of orthogonal basis functions and then quantize the coefficients. The decoder performs an inverse transform on the quantized coefficients to produce a reconstructed image. In video systems, the frame-to-frame correlation is also removed and the residual image is encoded. To do this effectively, the coder must estimate and compensate for any frame-to-frame motion.

The existing Motion Picture Expert Group (MPEG) standards for coding digital video data use the DCT with motion estimation and compensation. By intelligently allocating bits to the transform coefficients, the quality of the reconstructed image for a given bit rate can be optimized or, alternately, the number of bits required for a desired quality can be minimized. Quality is typically measured in terms of distortion, i.e. the signal-to-noise ratio (SNR) of the reconstructed image, or perceptual quality, i.e. how good the displayed image appears to a viewer.

The classical solution to the bit allocation is posed as:

$$D = D(b) = \Sigma W_i(b_i) g_i \text{ for } i=1 \text{ to } k \quad (1)$$

subject to the constraint that $$\Sigma b_i \leq B \text{ for } i=1 \text{ to } k \quad (2)$$

where D is the overall distortion, $W_i(b_i)$ is the distortion incurred in optimally quantizing the $i^{th}$ transform coefficient with $b_i$ bit, $g_i$ is a weighting coefficient, and B is the total number of available bits. To optimize SNR, the weighting coefficients $g_i$ are all set to one such that the distortion in each transform coefficient is given equal weight. As a result, under the optimal allocation each transform coefficient incurs the same average distortion.

However, it is well known that SNR and visual quality are not perfectly correlated. The human visual system (HVS) resembles a bandpass filter that is less sensitive to very low and high frequencies. Therefore systems that maximize SNR do not necessarily optimize image quality. The preferred, but currently unsolved approach, would be to find a better distortion measure that mirrors perceived quality. A simpler approach is to select the weighting coefficients gi based on the modulation transfer function (MTF) of the HVS to de-emphasize distortion in very low and high frequency transform coefficients. Although this will reduce the SNR of the reconstructed image, the perceived quality of the image should improve. U.S. Pat. No 4,780,761 describes a source coder in which the transform coefficients are quantized according to a two-dimensional model of the sensitivity of the human visual system.

The standard display device for viewing still and video imagery and for evaluating the perceived quality of the coding algorithm has been the cathode ray tube (CRT). Known CRTs exhibit an 8-bit color depth and provide an emissive and contiguous, i.e. non-tesselated, display that turns the individual phosphors on and off very quickly, on the order of ns, such that the reconstructed image exhibits minimal after-image effects such as blurring or ghosting. Typically, the CRT's electron spot is "defocused" by increasing the aperture size to avoid aliasing problems. Any effect the CRT might have on perceived quality is incorporated into the coding algorithm in the psychovisual responses of the test subjects. Their responses may be used to fine tune the HVS model or bit allocation algorithm, but are not directly included as a MTF in the coding algorithm.

In recent years, advances in liquid crystal display (LCD) technology has improved picture quality to the point that flat panel displays have become the platform of choice for many applications such as lap top computers, multimedia and video conferencing. The LCD display is a passive, multi-line driven or active matrix addressed non-emissive tesselated display that exhibits response times orders of magnitude slower than current CRT technology and a color depth that is smaller, typically 6 bits.

The tesselated display is caused by the discrete nature of the LCD pixels, which must be electrically and hence physically isolated from each other. In low cost LCDs used in instrumentation equipment, white light passes directly through this tesselation pattern and is perceived as a white matrix. In higher quality LCDs used in video systems, the tesselation pattern is coated with a black substance to provide a good black state and hence decent contrast ratio. In either case, the viewer perceives this matrix overlayed on the image. James Larimer, "Visual Effects of the Black Matrix in Tessellated Displays," SID 95 DIGEST, 99. 49–51 discusses the effects in detail.

The LCD's sluggish response time causes noticeable after-image effects such as image sticking, ghosting or motion blur. For example, dragging the mouse arrow across the LCD of a lap top computer will produce one or more of these effects. The LCD's color depth is limited by the cost of providing a high resolution voltage driver to switch the LCD. The lack of color depth, the tesselated display, and sluggish response times are viewed as limitations on flat panel displays to be overcome through advances in LCD technology. Specifically, improving the voltage driver, increasing the LCD's aperture ratio, and reducing response time.

SUMMARY OF THE INVENTION

In view of the above problems, the present invention provides a method for coding digital imagery for display on an LCD flat panel display with improved perceptual quality for a given channel bandwidth.

This is accomplished by exploiting the spatial and temporal masking properties associated with the LCD's tesselated display and sluggish response times, respectively. The black/white matrix generates a strong noise component at the spatial Nyquist frequency that masks the upper octaves of the signal spectrum. The sluggish response further reduces the spatial resolution of objects whose motion vectors exceed a critical velocity for a given frame rate, aperture ratio, pixel size and viewing distance. This temporal masking effect increases with the object velocity. The source coder effectively shifts bits from the masked transform coefficients to unmasked coefficients thereby improving the perceived visual quality of the reconstructed image. Furthermore, the encoder can be designed to match the color depth associated with the LCD.

These and other features and advantages of the invention will be apparent to those skilled in the art from the following detailed description of preferred embodiments, taken together with the accompanying drawings, in which:

DETAILED DESCRIPTION OF THE INVENTION

The present invention improves the perceived visual quality associated with LCD flat panel displays by treating their spatial and temporal masking properties not as limitations but as opportunities to be exploited. The LCD's black/white matrix, referred to hereafter as black matrix, produces a strong masking function centered at the spatial Nyquist frequency that raises the contrast sensitivity threshold in the upper octaves of the signal spectrum. The crossover frequency of the black matrix masking function and the system MTF, which is dominated by the LCD MTF but may also include the HVS and channel MTFs, establishes a spatial cut-off frequency for the entire image above which the transform coefficients can be eliminated without affecting perceived visual quality. The sluggish response time of the LCD further reduces the spatial cut-off frequency of the individual image blocks whose motion vectors exceed a critical velocity. The LCD's spatial and temporal masking properties are exploited by shifting the bits that would have otherwise been allocated to the eliminated transform coefficients to other lower frequency transform coefficients at which a viewer is sensitive to errors in the displayed image. In essence, the source coder hides coding errors in the details of the imagery and the moving objects where the errors will not be perceived due to the LCD's masking effects.

Figure 1:
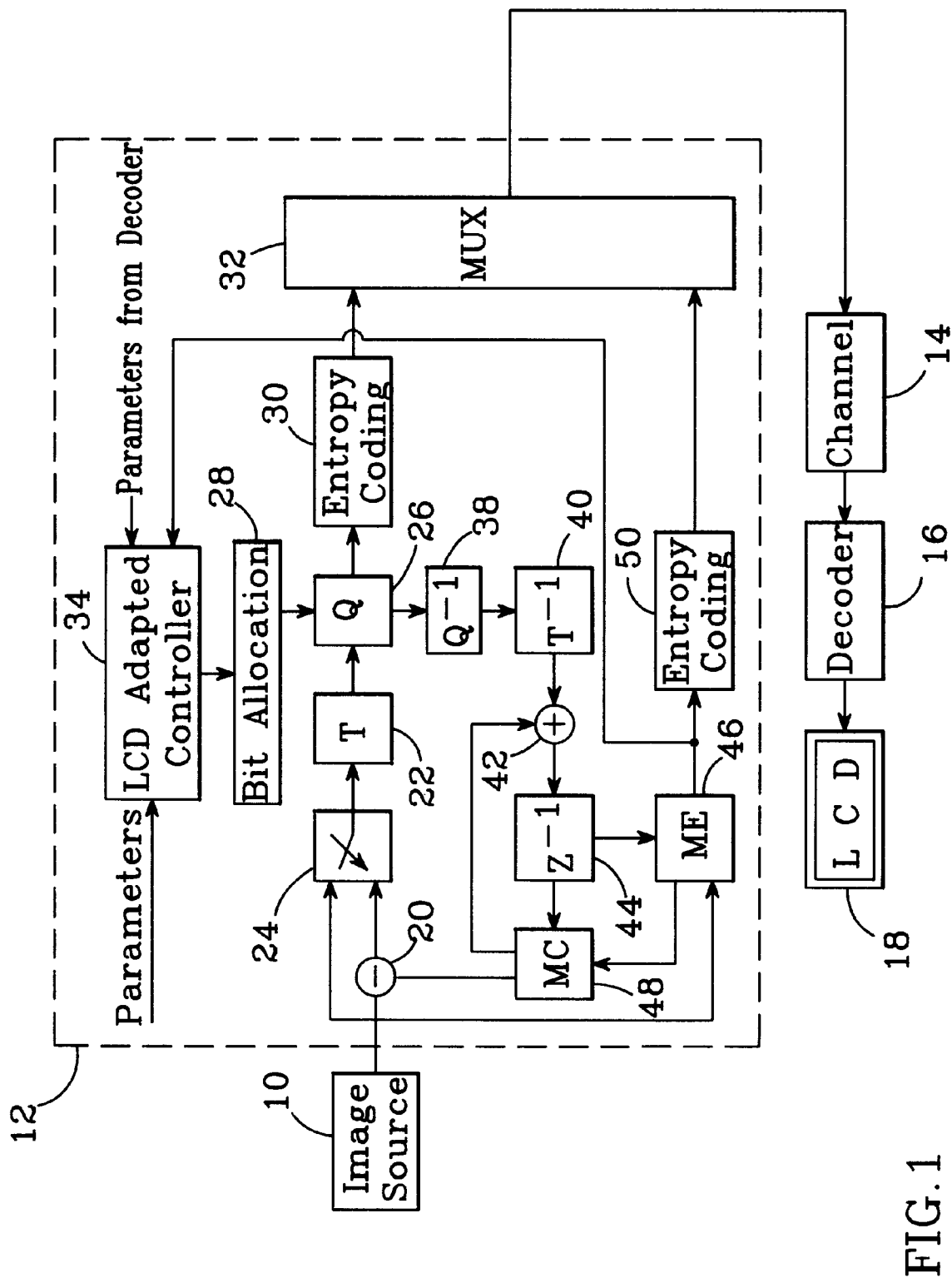
FIG. 1 is a block diagram of a video coding system that exploits the spatial and temporal masking properties of the LCD.

As shown in FIG. 1, the invention is described in the context of the video source coder architecture proposed in "Video Coding for Low Bitrate Communication," Telecommunication Standardization Sector of International Telecommunication Union (ITU), Draft H.263, pp. 1–49, Dec. 5, 1995, which is the precursor to the MPEG-4 standard, but is applicable to a wide range of transform based source coders for both video and still imagery. An image source 10 generates a digital video signal that is passed frame by frame to a source coder 12 that generates an image, either the original image or a residual image, transforms N×N blocks of pixel data into corresponding N×N blocks of transform coefficients using a block transform algorithm such as the DCT, quantizes the transform coefficients in accordance with a bit allocation matrix and transmits them over a limited bandwidth channel 14. A decoder 16 performs the inverse transform on the quantized coefficients to generate a reconstructed video signal that is displayed on an LCD flat panel display 18.

Source coder 12 includes a summing node 20 that subtracts a predicted image from the current image to generate the residual image. At the beginning of a video sequence, the coder passes the current frame to a block transform coder 22. After the coder's initialized, it then generates and transform codes residual image. The coder will periodically pass the current frame to reduce the accumulation of prediction and channel errors. This capability is shown diagramatically as switch 24. Transform coder 22 operates on successive N×N pixel blocks to generate N×N blocks of transform coefficients that correspond to frequency components from DC up to the Nyquist rate, which is set by the physical structure of the LCD, specifically its pixel pitch.

Quantizer(s) 26 quantizes each transform coefficient into a number of bits in accordance with a bit allocation matrix. Bit allocator 28 is typically designed to optimize some quality measure given a particular constraint. For example, each block, image, or set of images may be assigned a fixed number of bits which are to be allocated to maximize SNR or weighted SNR. Alternately, the allocator may be designed to assign the minimum number of bits necessary to achieve a desired distortion level, whether its SNR, weighted SNR or some other visual quality metric. The quantized coefficients are entropy coded 30 and sent with the bit allocation matrix to a multiplexer 32.

The masking effects of the LCD can be exploited in any of these cases to shift bits from high frequency components where they would be wasted to lower frequency components at which the human eye is sensitive to distortion on LCDs. As explained in detail in FIG. 2, LCD adapted controller 34 uses physical parameters of the LCD flat panel display 18, either the actual values or normative design values, an assumed viewing distance, the motion vectors, and may also use feedback from the decoder and other system MTFs to generate a window function for weighting the bit allocation. In the simplest case, the window function is an ideal truncation that has a value of 1 up to a cut-off frequency, which is determined by adapted controller 34, and a value of 0 above that. Alternately, the window function may incorporate the LCD, HVS and channel MTFs to perceptually shape the bit allocation matrix below the cut-off frequency. Furthermore, if a metric other than weighted SNR is used, the spatial and temporal masking effects may be characterized in a different form than the window function.

To generate the residual image, the quantized coefficents are first inverse quantized 38 and then inverse transformed 40 to generate a reconstructed residual image, which a summing junction 42 adds to the current predicted image to create the next predicted image without motion compensation. The predicted images are delayed by one or more frames in a frame buffer 44 and passed to a motion estimator 46 and a motion compensator 48 that together generated the predicted image that is summed at node 20 and the motion vectors that are passed to LCD adapted controller 34. The motion vectors are also entropy coded 50 and passed to MUX 32.

A known motion compensation technique uses a block-motion model that assumes that the image is composed of moving blocks. The simplest form of the model is that of 2D translational block motion, restricting the motion of each block to a pure translation. Namely, a N×N block in frame k centered about the pixel n is modeled as a globally shifted version of a same size block in frame k-1 where 1 is an integer and k-1>0. The translation distance is determined by searching for the block in frame k-1 that optimizes some criteria such as maximum cross-correlation, minimum mean square error or minimum absolute difference. The motion vector for the entire block is the translation distance of the corresponding block between frames k and k-1. Hence, motion compensation is achieved by copying the gray-scale and/or color information from the corresponding block in the frame k-1 on a pixel-by-pixel basis.

Figure 2:
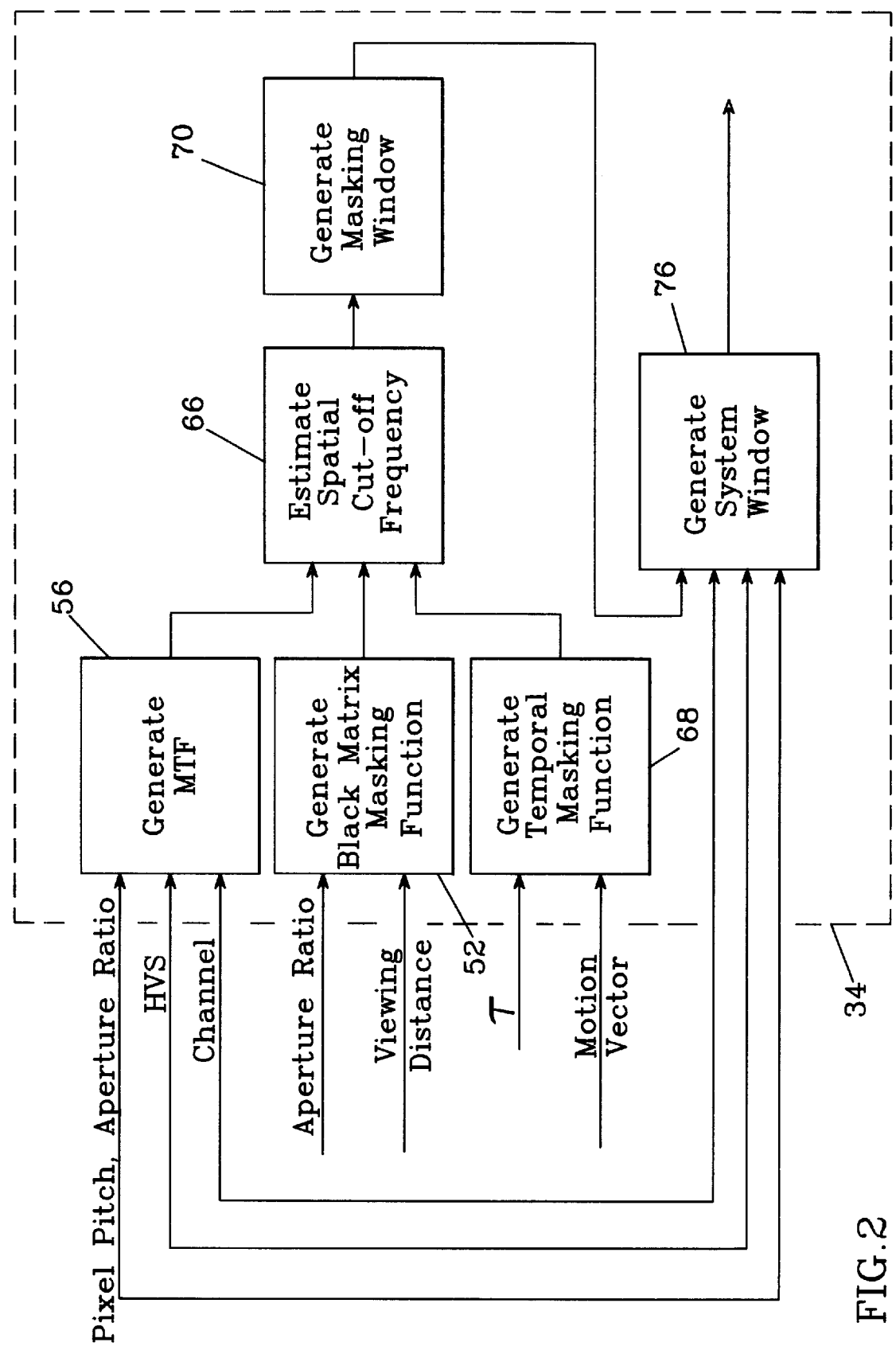
FIG. 2 is a flow chart illustrating the control process of the LCD adapted controller.
Figure 3:
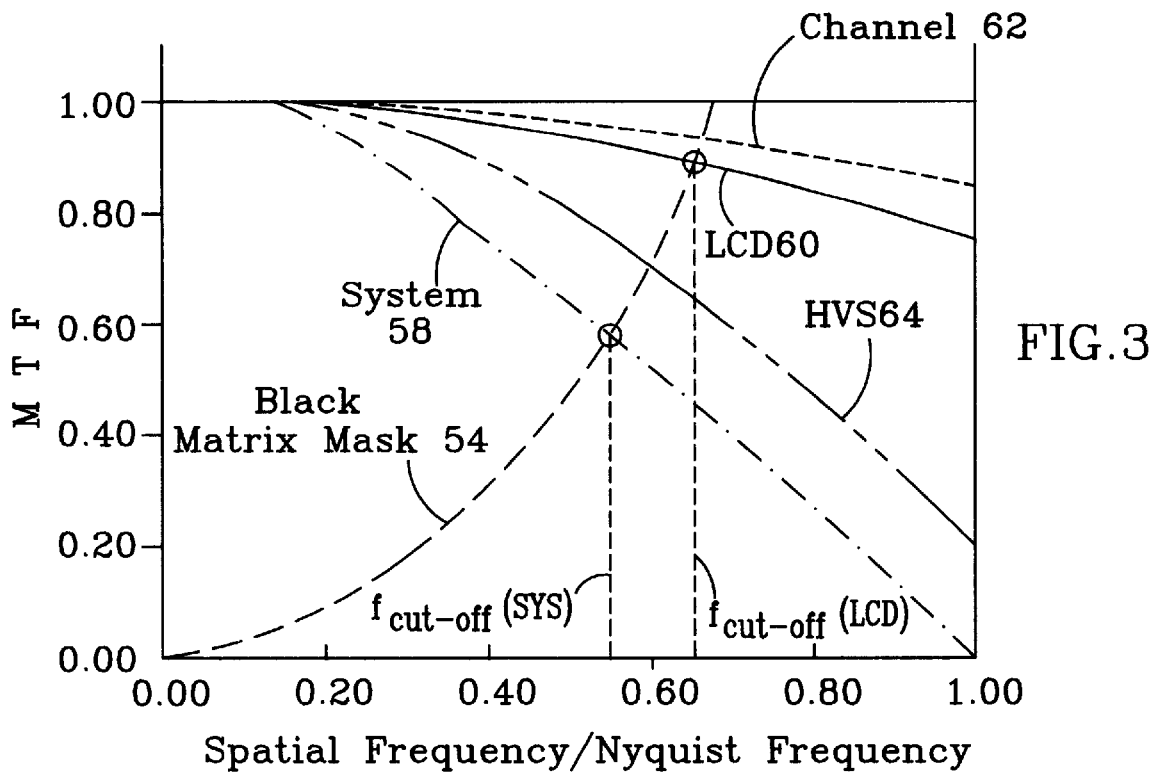
FIG. 3 is a plot of the black matrix masking function and system MTF.
Figure 5:
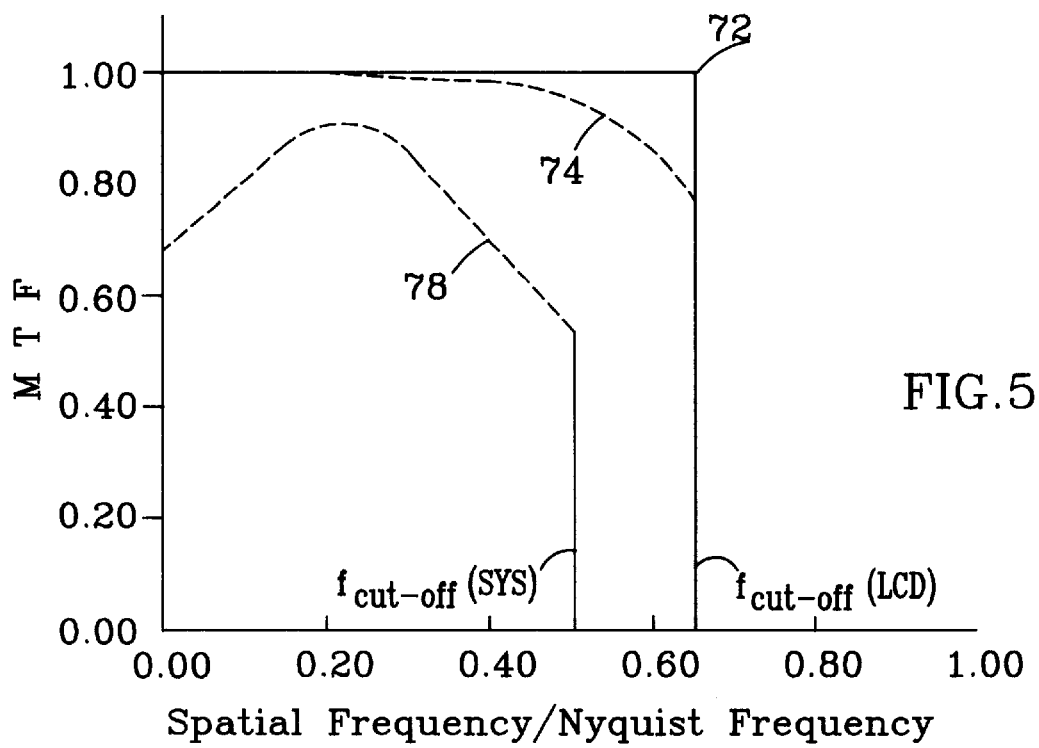
FIG. 5 is a plot of different window functions that can be used to weight the bit allocation.
Figure 4:
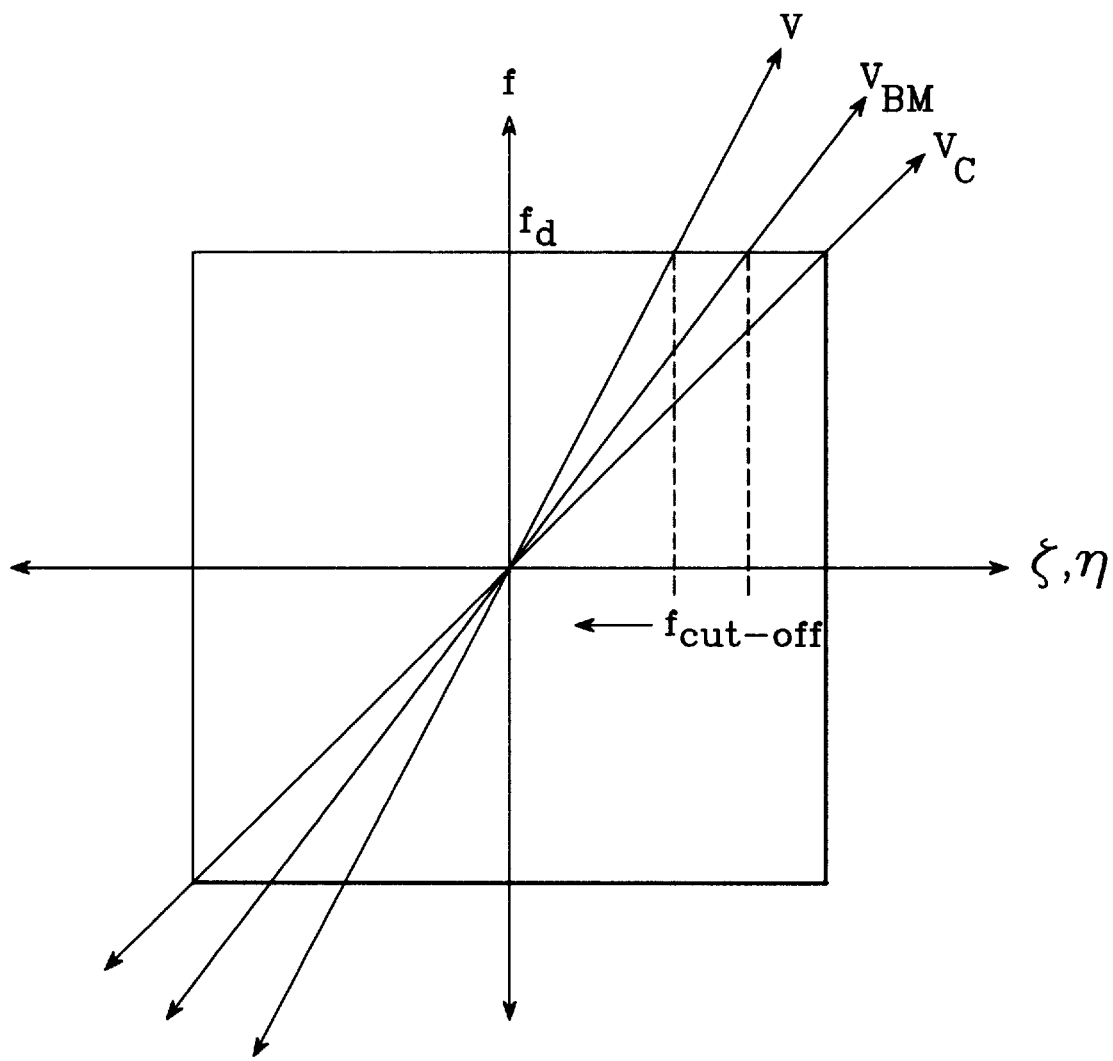
FIG. 4 is a plot of the temporal masking function.

As illustrated in FIG. 2, LCD adapted controller 34 uses the physical parameters of the LCD flat panel display such as pixel pitch, aperture ratio, an assumed viewing distance, the motion vectors, response time τ and optionally the HVS and channel MTFs to compute the spatial and temporal masking effects shown in FIGS. 3 and 4, respectively, and output the window function shown in FIG. 5. Controller 34 estimates a spatial cut-off frequency, generates a masking window function that eliminates frequency components above the spatial cut-off frequency, and then either outputs the masking window function or combines it with the LCD, HVS, and channel MTFs.

In the preferred embodiment, the controller determines the spatial masking effects associated with the LCD's black matrix to estimate a spatial cut-off frequency for all of the image blocks and then determines the temporal masking effects associated with the LCD's sluggish response to see whether they further reduce the spatial cut-off frequency for a given block. The order can be switched or either masking effect considered individually. For simplicity the spatial masking and cut-off frequency is described and illustrated in one dimension Although the values in the x and y directions are not necessarily the same, the same principles apply.

Controller 34 generates (step 52) a masking function 54 as shown in FIG. 3 that is centered at the Nyquist frequency. One model of the masking function is as follows:

$$\text{mask}(f) = A(f_{Nyq}, d, G) S(f_{Nyq}) \quad (3)$$

where $A(f_{Nyq}, d, G)$ is the amplitude function, $f_{Nyq}$ is the spatial Nyquist frequency and is equal to one over twice the pixel pitch, d is the viewing distance and G is the aperture ratio $G_x G_y$ where $G_x$ and $G_y$ are the pixel duty cycles in the x and y directions, respectively, and $S(f/f_{Nyq})$ is the shape function centered at the Nyquist frequency. The aperture ratio G=pixel width/pixel pitch where pitch is the distance between the centers of adjacent pixels on the x or y directions. Due to the black matrix, pixel pitch is never smaller than pixel width, and thus G≦100%.

A simple model for the amplitude function is given as follows:

$$A(f_{Nyq}, d, G) = c(1-G) \quad (4)$$

where c is a constant that incorporates the Nyquist frequency and the viewing distance. Although many different shape functions may be used, the Applicant's selected the distribution function specified in equation 40 of Peter Barten's "Simple Model for Spatial Frequency Masking and Contrast Discrimination," Human Vision, Visual Processing & Digital Display VI, SPIE Vol. 2411, pp. 142–158, February 1995, in which Barten presents a model for the general problem of masking of a spatial frequency pattern by non-white noise.

Controller 34 also generates a system MTF (step 56). Ideally, the system MTF 58 shown in FIG. 3 incorporates each of the mechanisms, e.g. the LCD MTF 60, channel MTF 62, and HVS MTF 64, that affect the contrast sensitivity over the signal spectrum. The system MTF is typically calculated by cascading the individual MTFs. Although this is not mathematically correct due to the nonlinearity of the HVS, it is simple and provides reasonable accuracy. Furthermore, since the LCD MTF 60 tends to dominate the other effects it is even simpler to use it as the system MTF and ignore HVS and channel effects. Assuming uniform intensity across the pixel, the LCD MTF 60 is given as follows:

$$\text{MTF} = \text{Sinc}(G_x x_s \zeta) \text{Sinc}(G_y y_s \eta) \quad (5)$$

where $\text{Sinc}(x) = \sin(\pi x)/(\pi x)$, $G_x$ and $G_y$ are the pixel duty cycles, $x_s, y_s$ are the pixel pitches, and $\zeta, \eta$ are the spatial frequencies in the x and y directions.

Controller 34 determines the crossover frequency of the black matrix mask 54 and the system MTF and establishes that frequency as the spatial cut-off frequency (step 66) As shown in FIG. 3, when the frequency exceeds the cut-off frequency, the masking effect is greater than the contrast sensitivity of the system. Consequently, it does not matter whether transform coefficients above the cut-off frequency are coded losslessly or with zero bits. Hence, these components are eliminated and the bits allocated elsewhere. Alternately, the cut-off frequency can be determined from the difference between the MTF and masking function. The cut-off frequency would be set to that frequency whose difference is equal to a threshold value, positive or negative.

Note, when only the LCD MTF is considered, the cut-off frequency for this particular example falls at a normalized frequency of approximately 0.65 for a pixel pitch of 0.33 mm, an aperture ratio of 70% and a viewing distance of 0.5 m. Since the MTFs are never greater than one, the combined system function is guaranteed to move the cut-off frequency down. However, since the LCD effect dominates the frequency is only shifted to approximately 0.59. This small difference probably does not justify the amount of computations needed to compute the system MTF.

The sluggishness of the liquid crystals also tends to mask the detail of an object when it is moving in the image. Controller 34 uses the liquid crystals' response time τ and the block's motion vector v to generate a temporal masking function (step 68). As shown in FIG. 4, the liquid crystals' response time τ acts as a temporal filter to remove all temporal frequencies above a temporal cut-off frequency $f_d = a/\tau$ where a is a constant. Ignoring the black matrix effects for now, the spatial Nyquist frequency, which is set by the pitch of the LCD, and the temporal cut-off frequency for a given frame rate, pixel size and viewing distance define a critical velocity $V_C$ equal to the slope of the line through the origin and the intersection of the two frequencies. For velocities below $V_C$, the temporal sampling rate, although slow, is adequate to resolve spatial features up to the Nyquist rate. However, when the velocity exceeds $V_C$, the spatial cut-off frequency $f_{motion}$ falls below Nyquist and the components above the cut-off are masked.

When used in conjunction with the black matrix masking, the black matrix spatial cut-off frequency $f_{cut-off}$ establishes a critical velocity $V_{BM}$ that is higher than $V_C$. Since $f_{cut-off}$ is smaller than the Nyquist frequency, the slope to the temporal cut-off frequency and, hence the critical velocity is higher. How high depends on the extent of the black matrix masking effects. As a result, when a block's motion vector V exceeds the critical velocity $V_{BM}$, cut-off frequency estimator 66 shifts the cut-off frequency down to the value set by the temporal masking effect. Otherwise, the estimator 66 maintains the cut-off frequency set by the spatial black matrix masking effect.

Once the block's cut-off frequency $f_{cut\text{-}off}$ is set, controller 34 generates a masking window function (step 70) of the types shown in FIG. 5, which include an ideal truncation window 72 and a smoothed truncation window 74. Both windows eliminate all of the transform coefficients above the cut-off frequency. Although this is not necessary to improve perceptual performance, there is simply no reason to waste bits coding these coefficients.

The ideal truncation window 72 simply eliminates these coefficients so that the bit allocator functions as if they never existed, i.e. their weights are assigned a value of zero, but does not change the relative weighting of the other coefficients. The smoothed truncation window 74 takes into account the fact that although the spatial and temporal masking effects have not eliminated the components near the cut-off frequency, the perceived effect of distortion in these components is reduced. The bit allocator weights the remaining coefficients according to the window.

Controller 34 either outputs the masking window 72 or 74 as the system window or can combine it with the LCD, HVS, and channel MTFs to generate a system window 78 as shown in FIG. 5. The masking window is much easier to compute and is reasonably accurate. The elimination of the masked transform coefficients tends to have a much greater effect than the relative weight of the remaining coefficients. In theory, the combined system window should more accurately reflect the contrast sensitivity of the overall system. However, this assumes that the models are accurate.

Together the black matrix and temporal masking effects have been found to reduce the overall bit rate by 10% to 20% below 64 kbit/second without degrading visual quality. The amount of savings is obviously higher for video signals with a lot of motion. Approximately 90% of the savings is realized from the black matrix effect with the remaining 10% being attributable to the motion effect. These numbers are skewed somewhat by the fact that the black matrix effect is computed first.

It is important to note that the use of this algorithm with a CRT display would either do nothing or introduce coding artifacts. If the source coder encodes the video signal using the CRT parameters, i.e. no black matrix and a very fast response time, the estimated cut-off frequency would be at or above the Nyquist rate and thus have no effect. Conversely, if the source coder encodes the video signal using the parameters for a typical LCD flat-panel display, the detail that is perceivable on a CRT display would not be coded and thus would create visual artifacts.

Another aspect or limitation of LCDs is that they need a voltage driver. Thus, the resolution of the voltage driver must be very fine to achieve the 8-bit color depth associated with CRTs. This is difficult and expensive. Furthermore, since LCDs exhibit less contrast than CRTs 8 bits of color depth would be wasted. Therefore, the source coder 12 in FIG. 1 is preferably redesigned for a color depth that matches the resolution of the LCD flat panel display, currently 6-bits. This is done by setting quantizer 26's quantization parameter in accordance with the desired bit rate and adjusting all of the threshold values in the motion estimator and compensator. This produces minimal coding improvements but the hardware is cheaper because it is designed at a lower rate than the CRT coding hardware.

While several illustrative embodiments of the invention have been shown and described, numerous variations and alternate embodiments will occur to those skilled in the art. For example, if a wavelet transform was used, the LCD adapted controller could be used to select the basis function for the transform in addition to modifying the bit allocation matrix. Such variations and alternate embodiments are contemplated, and can be made without departing from the spirit and scope of the invention as defined in the appended claims.

We claim:

1. A method of coding imagery for liquid crystal displays (LCDs) to improve perceptual quality, comprising:

transform coding blocks of pixel data from an image into corresponding blocks of transform coefficients;

exploiting the masking effects of the LCD to generate a bit allocation matrix for each said block that shifts bits from masked transform coefficients to unmasked transform coefficients; and quantizing the blocks of transform coefficients in accordance with said bit allocation matrices.

2. The method of claim 1, wherein the masked transform coefficients are eliminated and the available bits are allocated to the remaining transform coefficients.

3. The method of claim 2, wherein the bit allocation matrix is generated by:

generating a spatial masking function centered at the spatial Nyquist frequency that sets a spatial cut-off frequency for all the blocks in said image;

generating a motion vector for each said block;

generating a temporal masking function that reduces the spatial cut-off frequency for those blocks whose motion vector that exceeds a critical velocity set by the spatial cut-off frequency for the image;

eliminating the transform coefficients in each block that lie above that block's spatial cut-off frequency; and allocating the available bits to the remaining transform coefficients.

4. The method of claim 3, wherein the bit allocation matrix is generated by maximizing the signal-to-noise ratio (SNR) of the remaining transform coefficients.

5. The method of claim 3, wherein the bit allocation matrix is generated by maximizing the signal-to-noise ratio (SNR) of the remaining transform coefficients weighted by a perceptual window.

6. The method of claim 1, wherein the LCD has an array of pixels that are separated by a black matrix that has a pixel pitch, said bit allocation matrix being generated by:

computing a black matrix masking function that is centered at the Nyquist frequency as defined by the pixel pitch of the black matrix;

eliminating the transform coefficients that are masked by the black matrix masking function; and allocating the available bits to the remaining transform coefficients.

7. The method of claim 6, wherein the generation of said bit allocation matrix further comprises:

computing a system modulation transfer function (MTF);

computing a spatial cut-off frequency at which the black matrix masking function and the system MTF are equal; and eliminating the transform coefficients that lie above the spatial cut-off frequency.

8. The method of claim 7, wherein the system MTF is computed by generating an MTF for the LCD.

9. The method of claim 8, wherein said LCD MTF is combined with a human visual system (HVS) MTF.

10. The method of claim 7, wherein the bit allocation matrix is generated by maximizing a weighted signal-to-noise ratio (SNR) of the quantized transform coefficients, said transform coefficients being eliminated by weighting the distortion associated with the quantized transform coefficients with a masking window that is set to zero above the spatial cut-off frequency.

11. The method of claim 10, wherein the masking window has a value of one below the spatial cut-off frequency.

12. The method of claim 10, wherein the masking window is combined with a human visual system modulation transfer function (MTF) to weight the distortion.

13. The method of claim 1, wherein the response time $\tau$ of the LCD creates a temporal filter that removes all temporal frequencies above a temporal cut-off frequency $f_d=1/\tau$ and the pixel pitch of the LCD defines the spatial Nyquist frequency, further comprising:
using the temporal cut-off frequency and the spatial Nyquist frequency to compute a critical block velocity;
generating a motion vector for each said block;
detecting those blocks whose motion vectors exceed the critical velocity;
using the respective motion vectors and the temporal cut-off frequency to compute a spatial cut-off frequency for each of the detected blocks;
eliminating the transform coefficients in each block that lie above that block's spatial cut-off frequency; and
allocating bits based upon the remaining transform coefficients in each said block.

14. A method of coding imagery for liquid crystal displays (LCDS) to improve perceptual quality, said LCD comprising an array of pixels that are separated by a black matrix with a pixel pitch, comprising:
transform coding blocks of pixel data from an image into corresponding blocks of transform coefficients;
generating a black matrix masking function that is centered at the spatial Nyquist frequency defined by the pixel pitch;
generating a system modulation transfer function (MTF);
computing a spatial cut-off frequency at which the black matrix masking function and the system MTF are equal;
eliminating the transform coefficients in each said block that lie above the spatial cut-off frequency;
allocating the available bits to the remaining transform coefficients to generate a bit allocation matrix; and
quantizing the blocks of transform coefficients in accordance with said bit allocation matrices.

15. The method of claim 14, wherein the system MTF is computed by generating an MTF for the LCD.

16. The method of claim 15, wherein said LCD MTF is combined with a human visual system (HVS) MTF.

17. The method of claim 14, wherein the bit allocation matrix is generated by maximizing a weighted signal-to-noise ratio (SNR) of the quantized transform coefficients, said transform coefficients being eliminated by weighting the distortion associated with the quantized transform coefficients with a masking window that perceptually weights the transform coefficients below the spatial cut-off frequency and is set to zero above the spatial cut-off frequency.

18. The method of claim 14, wherein the response time $\tau$ of the LCD creates a temporal filter that removes all temporal frequencies above a temporal cut-off frequency $f_d=1/\tau$, further comprising:
using the temporal cut-off frequency and the spatial cut-off frequency to compute a critical block velocity;
generating a motion vector for each said block;
detecting those blocks whose motion vectors exceed the critical velocity;
using the respective motion vectors and the temporal cut-off frequency for each of the detected blocks to shift the spatial cut-off frequency downwards;
eliminating the transform coefficients in each block that lie above that block's spatial cut-off frequency; and
allocating bits based upon the remaining transform coefficients in each said block.

19. A method of coding a video signal for liquid crystal displays (LCDs) to improve perceptual quality, said LCD having a response time $\tau$ that creates a temporal filter that removes all temporal frequencies above a temporal cutoff frequency $f_d=1/\tau$ and a pixel pitch that defines the spatial Nyquist frequency, comprising:
transform coding blocks of pixel data from each successive frame into corresponding blocks of transform coefficients;
using the temporal cut-off frequency and the spatial Nyquist frequency to compute a critical block velocity;
generating a motion vector for each said block;
detecting those blocks whose motion vectors exceed the critical velocity;
using the respective motion vectors and the temporal cut-off frequency to compute a spatial cut-off frequency for each of the detected blocks that lies below the spatial Nyquist frequency;
eliminating the transform coefficients in each block that lie above that block's cut-off frequency;
allocating bits based upon the remaining transform coefficients in each said block; and
quantizing the blocks of transform coefficients in accordance with said bit allocation matrices.

20. The method of claim 19, further comprising:
computing a black matrix masking function that is centered at the Nyquist frequency;
computing a system modulation transfer function (MTF);
computing a crossover frequency at which the black matrix masking function and the system MTF are equal; and
lowering the maximum spatial cut-off frequency of said blocks to the crossover frequency thereby also raising the critical velocity to a value determined by the crossover frequency and the temporal cut-off frequency.

21. The method of claim 20, wherein the bit allocation matrix is generated by maximizing a weighted signal-to-noise ratio (SNR) of the quantized transform coefficients, said transform coefficients being eliminated by weighting the distortion associated with the quantized transform coefficients with a masking window that is set to zero above the spatial cut-off frequency for each said block.

22. A video system, comprising:
an image source that generates a video signal;
a source coder that generates a residual image for the current frame of the video signal, block transform codes blocks of pixel data from said residual image into corresponding blocks of transform coefficients, generates a bit allocation matrix for each said block, quantizes the transform coefficients in accordance with said bit allocation matrix, and estimates a motion vector for each said block to compensate for the frame-to-frame motion to compute the next residual image;

a channel for transmitting the quantized transform coefficients and bit allocation matrices;

a decoder that performs the inverse block transform on the quantized transform coefficients in accordance with the bit allocation matrices to generate a reconstructed video signal; and a liquid crystal display (LCD) for displaying the reconstructed video signal, said LCD comprising an array of pixels that are separated by a black matrix having a pixel pitch that defines the system's spatial Nyquist frequency, said pixels having a response time $\tau$ that creates a temporal filter that removes all temporal frequencies above a temporal cut-off frequency $f_d=1/\tau$, said source coder further comprising an LCD adapted controller that generates a black matrix masking function that sets a spatial cut-off frequency for all the blocks in said image, generates a temporal masking function that reduces the spatial cut-off frequency for those blocks whose motion vectors exceed a critical, and eliminates the transform coefficients in each block that lie above that block's spatial cut-off frequency so that the source coder allocates the available bits to the remaining transform coefficients.

23. The video system of claim 22, wherein the LCD adapted controller generates a system modulation transfer function (MTE) and sets the spatial cut-off frequency of the image at the frequency where the black matrix masking function and the system MTF are equal.

24. The video system of claim 23, wherein the LCD has a fixed color depth, said source coder's quantization and motion compensation being designed for said fixed color depth.

* * * * *